United States Patent [19]

Abbate

[11] Patent Number: 5,077,552

[45] Date of Patent: Dec. 31, 1991

[54] INTERFACE FOR COUPLING AUDIO AND VIDEO EQUIPMENT TO COMPUTER

[76] Inventor: Mark P. Abbate, 83 Main St., Norfolk, Mass. 02056

[21] Appl. No.: 392,085

[22] Filed: Aug. 10, 1989

[51] Int. Cl.$^5$ .......................... H04B 3/00; H03M 5/00
[52] U.S. Cl. .............................. 340/825.250; 341/55
[58] Field of Search ...................... 340/825.25, 825.24, 340/825.22, 825.06; 341/55, 82, 83, 95; 379/90; 375/8, 9, 10; 370/62, 15; 455/343

[56] References Cited

U.S. PATENT DOCUMENTS

| | | | |
|---|---|---|---|
| 4,701,746 | 10/1987 | Ueda et al. | 341/95 |
| 4,709,227 | 11/1987 | Guerillot | 341/95 |
| 4,752,765 | 6/1988 | Larson | 341/55 |
| 4,847,829 | 7/1989 | Tompkins et al. | 370/62 |
| 4,884,287 | 11/1989 | Jones et al. | 455/343 |

Primary Examiner—Donald J. Yusko
Assistant Examiner—Dervis Magistre
Attorney, Agent, or Firm—Greenfield & Sacks

[57] ABSTRACT

A method and apparatus for encoding data to be transmitted through a RS-422 standard serial interface such that the encoded data approximates one of the Control-L, Control-S wired or Control-S infrared protocols used in some audio and video equipment. Each bit of a data byte to be transmitted to the audio/video equipment is converted into one or more expansion bytes and transmitted at a baud rate such that the encoded bits approximate the shape and size of a bit in the data format of the selected protocol. In the case of Control-L protocol, the receiving port of the RS-422 is coupled directly to the serial interface port of the controlled device while the transmitting port is coupled through a diode to the serial interface port of the controlled device. For Control-S wired protocol, the transmit port of the RS-422 is coupled by an uninterrupted wire to the serial interface port of the controlled device. In Control-S infrared protocol, the transmit port of the RS-422 is coupled to an infrared light emitting diode which translates the data output from the RS-422 into infrared signals which are picked up by an infrared receiver at the controlled device.

36 Claims, 8 Drawing Sheets

SYSTEM OVERVIEW

INTERFACE FOR COUPLING AUDIO AND VIDEO EQUIPMENT TO COMPUTER

FIELD OF THE INVENTION

The invention pertains to a low cost interface for providing serial communication between a computer and audio/video equipment such as camcorders and video tape recorders. More particular, the invention relates to a combined hardware and software interfacing scheme for allowing a computer having an RS-422 standard serial interface to communicate with video equipment using any one of three specific protocols which are otherwise incompatible with the RS-422 standard serial interface.

BACKGROUND OF THE INVENTION

With the increasing prevalence of digitally operated electronic audio and video equipment such as camcorders and video tape recorder (VTRs) which are equipped for remote control, computer accessories which allow a home computer to control such audio/video equipment have been introduced to the market. However, the input/output interfaces, data formats and protocols used in home computers and the interfacing circuitry, data formats and protocols used in home video and audio equipment generally are not compatible. Therefore, elaborate hardware and software interfaces have been designed for converting the data formats and protocol of computers to the data formats and protocol of the various audio/video devices. Prior art interfaces for allowing communication between home computers and audio/video equipment typically have comprised an intermediate microprocessor with a standardized serial input/output port on the computer side and custom hardware compatible with the audio/video equipment on the audio/video side. The microprocessor includes software for converting data received from the serial port of the computer into a data format compatible with the audio/video equipment and for converting data received from the audio/video port to a data format compatible with the computer protocol. The cost of the intermediate microprocessor device including the various interfaces is substantial and may exceed the cost of the audio/video equipment which is to be controlled.

A standardized serial interface commonly utilized in home computers is the RS (Recommended Standard) -422 interface published by the Electonic Industries Association. For instance, the RS-422 standard interface is used in the Apple II and MacIntosh series of computers manufactured by Apple Computers, Inc. of Cupertino, Calif. Much literature is available on the RS-422 standard such as S. H. Stone, *Microcomputer Interfacing*, Addison-Wesley Publishing Co., 1982, pp161-178, which is incorporated by reference. Therefore, the standard will be only briefly described herein and reference should be made to other sources, including the above text, for a more detailed description of the RS-422 standard interface.

Figure 1:
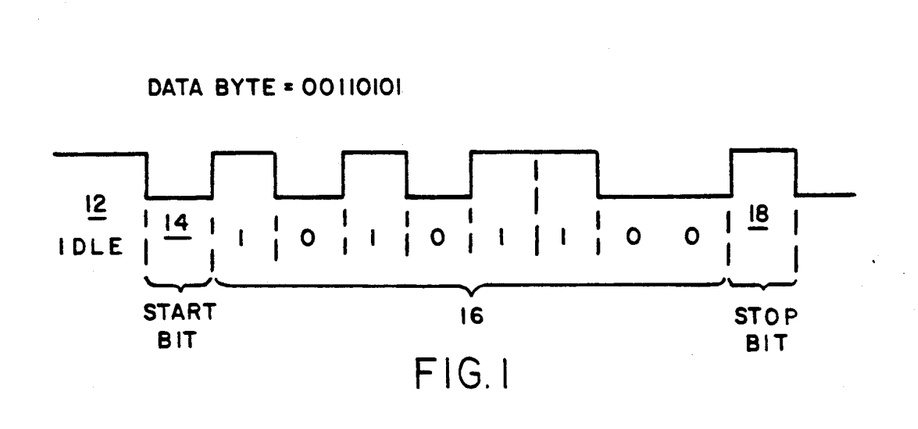
FIG. 1 is a timing diagram illustrating the RS-422 standard protocol.

The RS-422 standard is called an asynchronous protocol because there is no organized timing with respect to separate bytes of data. However, data transmission in the RS-422 standard is synchronous with respect to the individual bits within a single data byte. In the RS-422 standard serial interface, data is transmitted in packages (or characters) of ten or eleven bits comprising a start bit, eight bits of data and one or two stop bits. FIG. 1 illustrates the bit timing for the serial transmission of a byte of data using the RS-422 serial standard. The idle state 12 is a logic level 1. Each byte transmitted serially on the asynchronous link begins with a start bit 14 at logic level 0. The data byte is then transmitted in the following eight bit intervals with the least significant bit transmitted first and the most significant bit transmitted last. Therefore, as shown in FIG. 1, for example, the data byte 00110101 is transmitted in the second through ninth time intervals in the reverse order, 10101100. The data is then followed by 1, 1½ or 2 stop bits set to logic level 1. The transmission baud rate (and thus the bit length can be any of a number of possibilities.

The start and stop bits, in addition to identifying the beginning and ending of each byte, also permit the receiver of the byte to resynchronize its clock to each new character. Since the RS-422 serial interface is asynchronous, a character can begin at an arbitrary time. Therefore, the receiving device must determine when the character begin with sufficient accuracy so that it is able to sample the next 10 or 11 bits properly. Thus, the standard practice is for the receiver to wait ½ of an interval after receipt of the leading edge of the start bit to sample the data input line. This causes the receiver to sample the start bit at its midpoint. Thereafter, the clock of the receiving device causes it to sample the input line at periods equal to the bit interval so as to sample the following 9 or 10 bits at their midpoints. In this manner, if the clock in the receiving device and the clock in the transmitting device are within a five percent skew error of each other, the character will be received correctly. For instance, if the clock in the receiving device is running faster than the clock in the transmitting device, the receiving device will sample the data input line successively earlier in each bit interval over the following 10 or 11 sampling points. If the receiving clock is running less than 5% faster than the transmitting clock, the 11th sample point will still occur after the leading edge of the 11th transmitted bit. Much greater accuracy than 5% is easily achieved by present technology.

Figure 2:
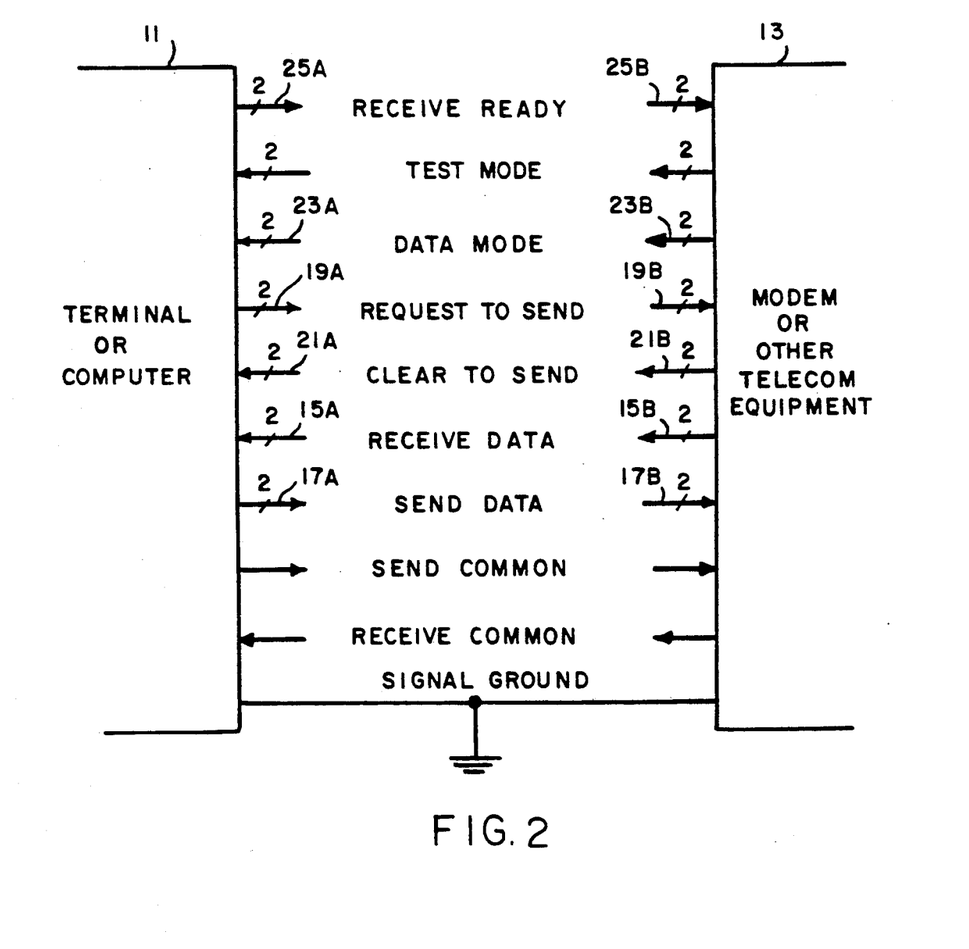
FIG. 2 is a block diagram illustrating some of the signal lines available on a RS-422 standard serial interface.

An RS-422 serial interface comprises two separate but mating interfacing portions providing complementary input and output lines as shown in FIG. 2. The two portions will be termed herein the computer portion 11 and the telecom portion 13. These terms are used because the RS-422 standard was originally developed for interfacing computers and other devices over telephone lines. However, it should be understood that these are used merely to provide distinction between the two portions and are not intended to limit the applicability of the RS-422 standard serial interface.

Some of the available lines will be described with respect to the computer portion 11 and it should be understood that the telecom portion 13 has complementary lines bearing the same names but having the opposite direction, i.e. the line on the telecom portion bearing the same name as a line that is an input line on the computer portion is an output line on the telecom portion and vice versa.

The RS-422 standard serial interface utilizes differentially driven wire pairs for each signal. Therefore, in the following description, each signal line described actually comprises two differentially driven signal pairs. Further, since the lines are differentially driven, data can be placed on the "data send" lines so that it is received at the receiving device either unaltered or inverted depending on how the "data send" lines are coupled. The computer portion of a RS-422 standard interface includes an input "receive data" bit 15A for receiving serial data from a telecom portion; a "data send" bit 17A for transmitting serial data to a telecom device; a "request to send" bit 19A for indicating to a telecom portion equipped device that data is ready to be sent; a "clear to send" bit 21A for receiving, from another device having the telecom portion, a signal in response to the "request to send" signal indicating that the other device is ready to receive data; a "data mode" bit 23A for receiving a signal from another device indicating that it wishes to write to the computer; and a "receive ready" bit 25A for responding to the "data mode" signal when the computer is ready to receive data. The signal lines of the telecom portion are designated with the same reference numerals as the complementary lines on the computer portion but designated with the letter B rather than A.

If the computer and RS-422 interface do not use compatible logic levels, the signal levels used within the computer, typically TTL or ECL, are converted to the logic levels used by the RS-422 immediately before transmission.

Audio and video equipment such as VTRs, tape decks, camcorders, etc. typically do not utilize the RS-422 standard interface but use custom integrated circuits to accomplish interfacing with other devices. For instance, video and audio equipment sold by Sony Corporation of America, of Paramus, N.J., utilizes custom ICs to carry out interfacing between devices via one of three protocols, referred to hereinafter as Control-L, Control-S wired and Control-S infrared. The Control-L and Control-S wired protocols allow most transport and control functions in many consumer camcorders and VTRs to be remotely controlled over a wire connection by another device. Control-S infrared allows the same type of functions to be controlled by another device via infrared transmissions. Control-S wired and Control-S infrared utilize the same data format, while Control-L utilizes a different format. Each of these three protocols will be described in detail in the following sections.

It is an object of the present invention to provide a low cost interface for allowing a home computer to communicate with and control home audio and video equipment.

It is a further object of the present invention to provide a low cost device which provides interfacing between an RS-422 standard computer serial interface and a consumer electronic product which uses Control-L, Control-S wired, or Control-S infrared protocol.

It is yet another object of the present invention to provide a method and apparatus for converting RS-422 standard protocol to Control-L, Control-S wired, and Control-S infrared protocol.

SUMMARY OF INVENTION

The invention comprises a method and apparatus which allows a computer having a RS-422 standard serial interface to communicate with and control audio and video equipment which uses Control-L, Control-S wired or Control-S infrared protocol. The invention includes a very simple and low cost interface circuit and a software package for encoding data such that when it is transmitted through an RS-422 standard serial interface, it emulates one of the three control protocols mentioned above. For Control-S infrared controlled audio/video devices, the "data send" line of the standard RS-422 interface is coupled to the controlled device via an infrared LED. For Control-S wired devices, the "data send" line of a standard RS-422 interface is coupled directly to the device by an uninterrupted wire. Finally, to control a Control-L device, the "data send" line of a standard RS-422 is coupled to the device through a diode while the "receive data" line of the RS-422 is coupled directly to the device through an uninterrupted wire.

Software is provided which encodes data at the transmit ports of the RS-422 that emulates any one of the three control protocols accurately enough for the controlled device (e.g. VTR) to properly receive and interpret the data. In the Control-L protocol, in which the controlled device transmits data to the computer as well as receives data, software is provided to read Control-L protocol from the "receive data" line of the RS-422. The data encoding accomplished by the software converts each bit of the data byte which is to be transmitted to the controlled device into one or more expansion bytes and causes the computer to transmit the encoded expansion bytes at a selected baud rate such that the transmitted expansion bytes appear to the controlled device to be a data byte in the selected protocol.

The invention will be understood more fully when the following detailed description of a preferred embodiment of the invention is read in conjunction with the drawing.

DETAILED DESCRIPTION OF THE INVENTION

Figure 3:
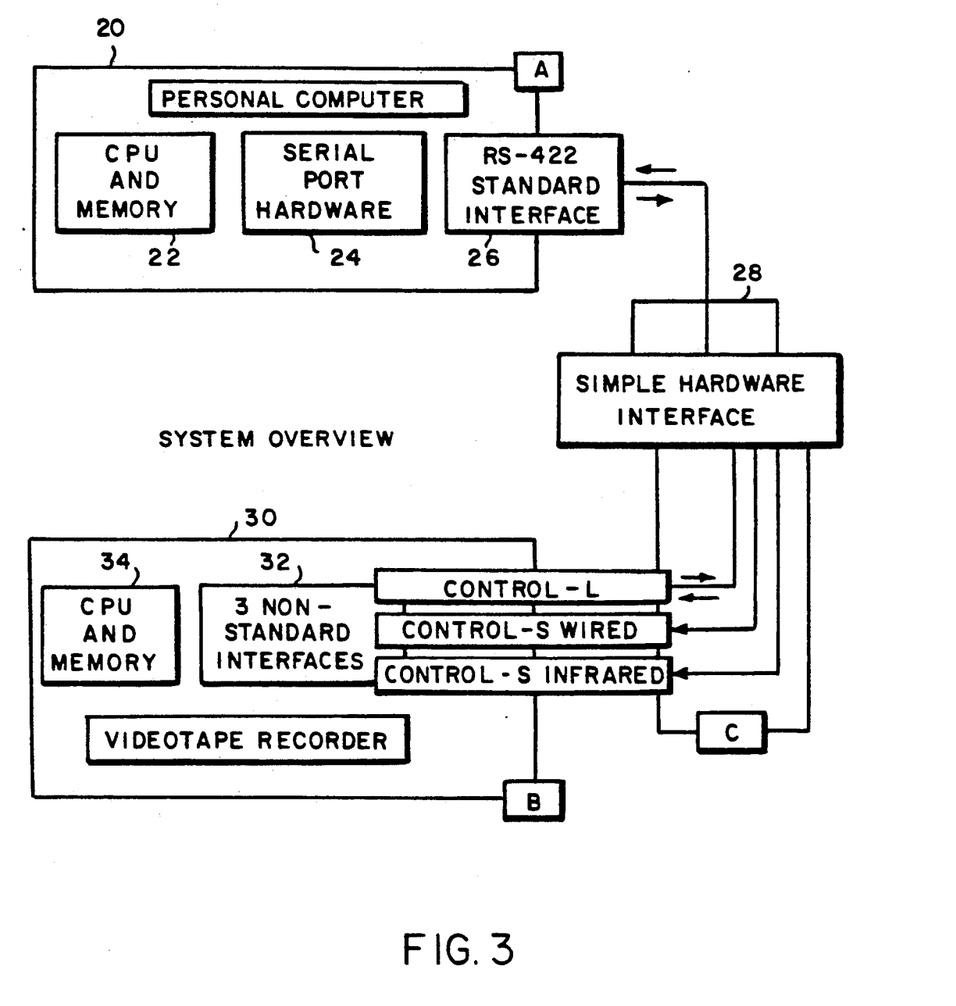
FIG. 3 is diagram illustrating the connection of the hardware interface of the present invention between a computer and a piece of audio/video equipment.

FIG. 3 illustrates the basic concept of the present invention. A personal computer 20, for example an Apple MacIntosh, includes a central processing unit and a memory, collectively shown at 22. It also includes serial port hardware 24 which, in the Apple MacIntosh, comprises a Zilog 8530 serial communications controller (SCC) integrated circuit which prepares data for transmission via an RS-422 standard serial interface 26. The serial port hardware 24 is coupled to the RS-422 standard interface 26 which provides direct serial interfacing with peripheral devices such as audio/video equipment. In FIG. 3, the interfacing hardware of the present invention is embodied within block 28. The software is executed within the CPU 22 the serial port hardware 24 and encodes the data to be transmitted into a format which, when transmitted through a RS-422 standard interface, emulates a selected one of three standard protocols used by audio and video equipment; Control-L, Control-S wired or Control-S infrared. The data is transmitted through a simple hardware interface 28 from the RS-422 port to a piece of audio/video equipment (the controlled device) 30 which comprises interfacing hardware 32 and software for receiving and/or transmitting data in one of the three mentioned protocols. The audio/video equipment also includes a CPU and memory, collectively shown at 34. If the logic level voltages of the RS-422 interface are different than the logic level voltages of the controlled device, the interfacing hardware 32 will include voltage translation circuitry for converting the RS-422 interface voltage levels to the voltage levels used in the controlled device. In the case of the Apple MacIntosh, the RS-422 interface transmits at standard TTL logic levels (logic 0=0 volts and logic 1=5 volts). The three above-mentioned protocols also use standard TTL logic levels, and, therefore, would not require voltage translation circuitry if the controlling computer is an Apple MacIntosh or other computer using TTL logic levels through an RS-422 standard interface.

In the case of a piece of equipment which utilizes Control-L protocol, the interface 32 also includes hardware and software for transmitting data, since this protocol allows the controlled device to transmit as well as receive data. Data transmitted by the controlled device might typically comprise the tape counter reading or the machine status. Equipment which uses Control-S wired or Control-S infrared protocol can only receive data and cannot transmit data.

Each protocol and encoding and transmitting scheme to emulate the data format and protocol will now be described in detail.

CONTROL-L

Control-L protocol allows most transport and control functions in many consumer type camcorders and VTRs to be remotely controlled over a wired connection by another device. It also allows the camcorder or VTR (hereinafter the controlled device) to send information back to the controlling device. Control-L is a bi-directional protocol in which the controlled device (as well as the controlling device) may transmit and receive data. The data, however, is direction specific. In Control-L protocol, the controlling device (computer) must operate in the master mode while the controlled device (VTR or camcorder) operates in slave mode. The Control-L electrical link is a single bit bi-directional bus structure. The same single wire is used for transmitting and receiving data. Control-L uses TTL logic levels, i.e. logic 0=0 volts and logic 1=5 volts.

In this protocol, the controlled device transmits data in groups of eight asynchronously framed bytes every 1/60th of a second. Each byte comprises one start bit followed by eight bits of data further followed by 2 or 3 stop bits. The eight data bits are arranged with the low order bit first and the high order bit last. NRZ encoding is used and the baud rate is 9600. The first two bytes of transmitted data are always empty. The controlling device (e.g., the computer) must insert the data which is to be transmitted to the controlled device (e.g., the VTR) exactly in the correct bit positions of the first two empty bytes that the controlled device transmits and with the low order bit first.

Figures 4A, 4B:
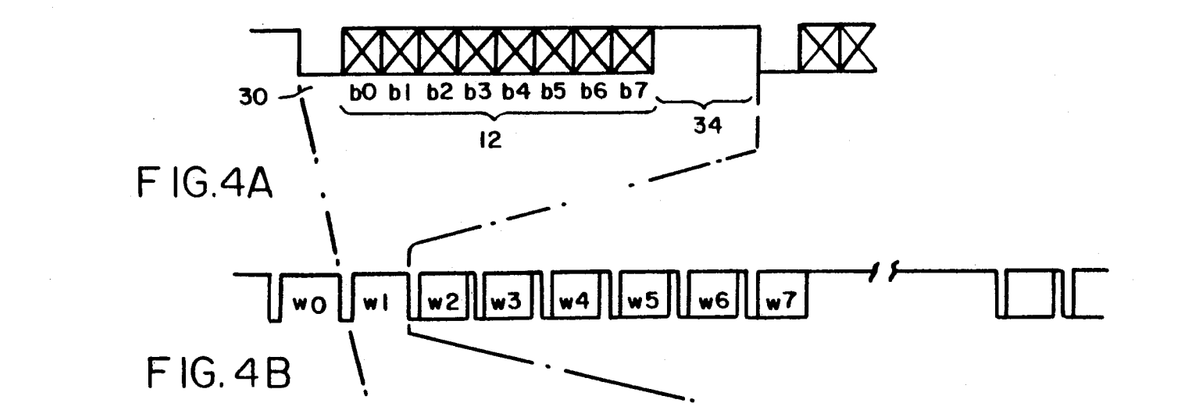
FIG. 4A and 4B are timing diagrams showing the format of data in the Control-L protocol.

From the above description, it can be seen that the computer which transmits data to audio/video equipment using the Control-L protocol transmits up to two bytes precisely timed to fit into the two empty bytes that the controlled device transmits. FIGS. 4A and 4B illustrate the structure for a byte of data transmitted in the Control-L protocol. FIG. 4B shows the group of eight asynchronously framed bytes transmitted by the controlled device. FIG. 4A shows the second byte in detail, including the data transmitted to the controlled device (the VTR) by the controlling device (the computer). As described above, each byte comprises a start bit 30 followed by eight bits of data 32 followed by 2 or 3 stop bits 34 (3 stop bits are shown in FIG. 4A). Since FIG. 4A shows the second byte, the eight bits of data comprise data inserted by the controlling device into the empty bit positions.

Figure 4C:
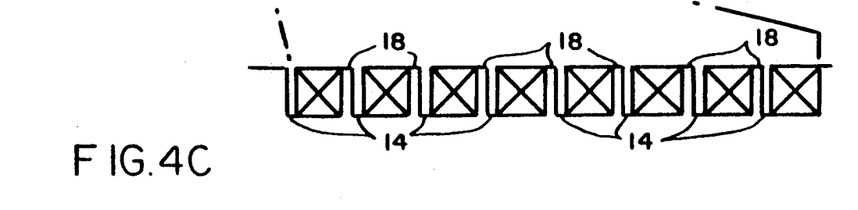
FIGS. 4C and 4D are timing diagrams showing the appearance of data when encoded to the Control-L protocol by the software of the present invention and transmitted via an RS-422 and the hardware of the present invention.

FIG. 4C shows the format of the data generated by the present invention to approximate the Control-L data format and protocol. The manner in which a computer having a RS-422 standard interface can produce data in the form shown in FIG. 4C will now be described in detail. As noted above, in Control-L protocol, each byte must be transmitted with the least significant bit transmitted first and the most significant bit transmitted last. Therefore, when the software of the present invention first receives a data byte for encoding and transmission to the controlled device, it reverses the bit order of the byte. For instance, if the data byte to be transmitted is 00110101, the software of the present invention reverses the bit order to produce 10101100. Before the byte is forwarded to the RS-422 port for transmission, each bit is encoded into an eight bit expansion byte and stored in a register. Bits of logic value zero are encoded as an expansion byte comprising eight consecutive bits of logic level zero (hereinafter referred to as 00 hexadecimal or 00H) and bits of logic value one are encoded as expansion bytes comprising eight consecutive logic ones (hereinafter referred to FF hexadecimal or FFH). Thus, the data byte which is generated in the computer as 00110101 is encoded as FFH, 00H, FFH, 00H, FFH, FFH, 00H, 00H. As noted above, an RS-422 standard interface transmits each byte with the least significant bit first and the most significant bit last. This, however, has no effect on the encoding of the present invention since both FFH and 00H are symmetric and, therefore, read the same backwards and forwards.

Once the data byte is encoded as described and stored in memory, the computer monitors the activity on the Control-L serial line from the controlled device until it finds the line idle (in Control-L, the idle state is logic 1) for more than 1 byte time period (which is 1.2 ms). This operation finds the space between the eight byte asynchronously framed data blocks. The computer must sense the start bit (a transfer from the logic level 1 idle state to the logic level zero start bit state). The computer then programs the serial communications controller (SCC) to receive serial data at 130,000 baud (8 data, 1 stop, no parity) which is approximately 13 times the actual 9600 baud rate of the controlled device. The high baud rate is selected so as to cause a break condition to be sensed by the SCC as early during the start bit as possible. A baud rate of 11–15 times the actual baud rate of the controlled device is preferred. Most SCCs, including the Zilog 8530 used in the Apple MacIntosh, are designed to monitor the serial data received by the computer through the RS-422 standard interface and to send a break signal to the CPU if it does not sense a stop bit (logic level high) nine bits after receiving the start bit. With the SCC running at 130,000 baud, and the controlled device running at 9600 baud, the SCC will send a break signal to the CPU approximately 9/13ths (actually (9600÷130,000) ×9) of the way through the start bit. The break signal indicates to the CPU that the start bit has been received. It is desirable to sense the start bit as early as possible so that the CPU has enough time before the data must be placed on the line to set up the SCC and the data for transmission as explained below. A baud rate of roughly 11–15 times the baud rate of the controlled device is desirable depending on the speed of the CPU.

Figure 4D:
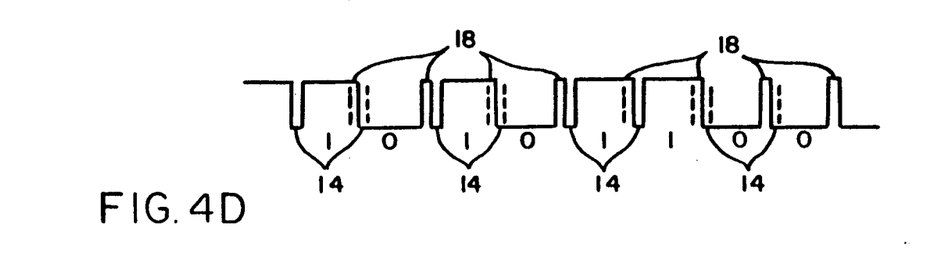

After the CPU senses the start bit 30, it programs the SCC to transmit, via the RS-422 interface, at 96,000 baud (8 data, 1 stop, no parity), which is ten times the actual 9600 baud rate of the controlled device. The computer then immediately loads the SCC with the eight expansion bytes that were previously generated by encoding the single data byte. The SCC then forwards the encoded data to the RS-422 interface for transmission. The resulting transmission to the controlled device is illustrated by FIGS. 4C and 4D. At 96,000 baud rate, (10 times the actual rate at which the controlled device receives data), each data byte comprises a start bit 14 followed by eight bits of data further followed by one stop bit for a total of ten bits per character. Thus, each character, transmitted at ten times the baud rate of the receiving device, will appear to the receiving device as a single bit of data transmitted at the appropriate baud rate. Consequently, an expansion byte of 00H will appear to the controlled device, operating at 1/10th the speed of the RS-422 baud rate, approximately as a single logic 0 and FFH will appear as a single logic 1 bit.

For each character transmitted, however, either the start bit (logic value 0) or the stop bit (logic value 1) will be inconsistent with the rest of the character. Nevertheless, as long as the controlled device latches each byte after the start bit and before the stop bit, it will receive the data correctly. Since the controlled device attempts to latch each "bit" (actually a ten-bit character as described above) at its center, the timing of the latching by the controlled device would have to be skewed by over 40% from the clock of the controlling device in order for it to improperly read the start or stop bit as the data. Such large errors are virtually non-existent in contemporary computer equipment. Thus, the data created by the encoding scheme as described above and transmitted at 96,000 baud by an RS-422 interface will be interpreted as data in the Control-L format at 9600 baud.

FIG. 4D illustrates how the data byte 00110101 would appear after encoding and transmission by the present invention. In FIG. 4D, reference numerals 14 show start bits, reference numerals 18 show stop bits and reference numerals 36 show the sampling points of the controlled device.

CONTROL-S WIRED

The Control-S wired protocol also allows most transport and control functions in many consumer level VTRs, etc. to be remotely controlled by another device through a wired connection. Control-S wired, however, differs from Control-L in that it is a uni-directional protocol. It only allows the controlling device to send data to the controlled device. Data cannot be transmitted in the opposite direction. Control-S wired uses TTL standards (0 volts = logic 0, 5 volts = logic 1). Control-S wired uses pulse width modulation for encoding digital data. Logic 0 is represented by 0.6 ms of 0 volts followed by 0.6 ms of 5 volts. Logic 1 is represented by 0.6 ms of 0 volts followed by 1.2 ms of 5 volts. In Control-S wired protocol, each word comprises 12 data bits. Each transmission begins with a start pulse which comprises a 5 volt level for 2.4 ms followed by the 12 data bits.

Data encoding in the present invention for Control-S wired protocol is very simple. The software of the present invention encodes a start pulse as four consecutive bytes of 00H, i.e. thirty two consecutive logic level zeros. A logic level 0 is encoded as FFH, 00H (i.e. 1111111100000000 binary), and a logic level 1 is encoded as FFH, 00H, 00H (i.e. 111111110000000000000000 binary). In both of the Control-S protocols, the transmitted data will be transmitted from the differentially driven "send data" lines in inverted form. This is why the bits of the above described encoded bytes are inverted from the Control-S wired data format.

The computer sets the baud rate of the SCC to 16,600 (8 data bits, 1 stop bit, no parity). At a 16,600 baud rate, each byte will be 0.6 ms in duration. The computer then sends the four start bytes followed by the data bytes in succession.

Figure 5A:
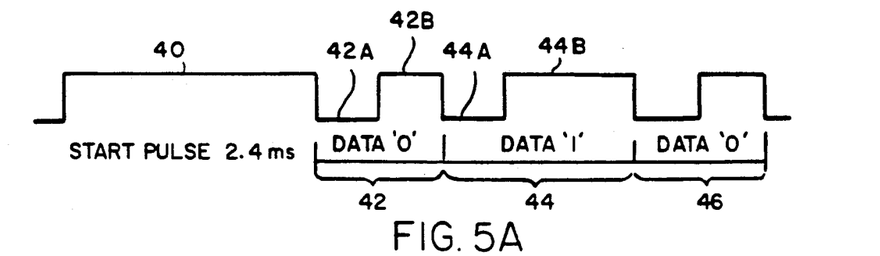
FIG. 5A is a timing diagram showing the format of data in the Control-S wired protocol.
Figure 5B:
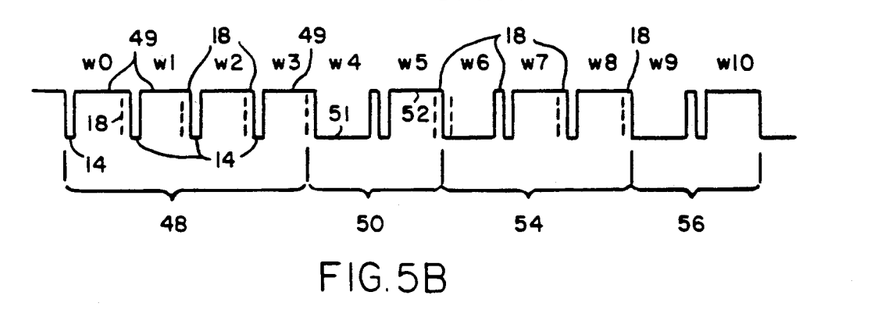
FIG. 5B is a timing diagram showing the appearance of data when encoded and transmitted via the present invention in Control-S wired protocol.

FIG. 5A shows a timing diagram for Control-S wired protocol. FIG. 5B shows the Control-S wired data emulated by the present invention. FIG. 5A shows the start pulse at 40 followed by three bits 42, 44 and 46 of the 12 bit data word. The remaining nine bits are similar to bits 42, 44 and 46. Logic level 0, illustrated by bit 42 in FIG. 5A, comprises logic low level 42A for 0.6 ms followed by logic high level 42B for 0.6 ms. Logic 1, illustrated by data bit 44, comprises logic low level 44A for 0.6 ms followed by logic high level 44B for 1.2 ms.

FIG. 5B shows the data that would be transmitted by the present invention to emulate the start signal and three bits shown in FIG. 5A. The resulting transmission of the start bit, encoded as four bytes of value 00H is shown at 48. The four consecutive 00H bytes each comprise start bit 14 followed by eight consecutive 1s (actually inverted zeros) collectively shown at 49, further followed by stop bit 18. (Remember that, in either of the Control-S protocols, the RS-422 interface inverts each bit of the eight data bits but not the start and stop bits). An encoded data 0 (FFH, 00H) is shown in FIG. 5B at 50. It comprises start bit 14 followed by eight inverted bits of logic level 1 51 further followed by stop bit 18 and next starting bit 14. Following the second starting bit 14 are eight bits of inverted logic 0 52 followed by a second stop bit 18. Data 1 is shown at 54 and should be self explanatory.

CONTROL-S INFRARED

Control-S infrared mode is similar to Control-S wired except that the data is transferred via an infrared LED as opposed to a wire connection. This protocol is commonly used to control the transport and control functions of camcorders, VTRs, and so forth, from remote control units. The logic levels and data format are the same as described above with respect to the Control-S wired protocol. Data encoding, however, is different. In Control-S infrared protocol, data is encoded by pulse width modulation using a 40 kHz AM carrier frequency. In Control-S infrared, logic level 0 is represented by 0.6 ms of no 40 kHz AM carrier signal followed by 0.6 ms of 40 kHz AM carrier signal. Logic level 1 is represented by 0.6 ms of no 40 kHz AM carrier signal followed by 1.2 ms of 40 kHz AM carrier signal.

Although the data format of Control-S infrared is the same as Control-S wired, the bit encoding is different, thereby requiring a different encoding scheme. The start pulse for Control-S infrared is encoded as 20 hexadecimal bytes of value AAH. Logic level 0 is encoded as ten expansion bytes of values FFH, FFH, FFH, FFH, FFH, AAH, AAH, AAH, AAH, AAH. Logic level 1 is encoded as fifteen expansion bytes of value FFH, FFH, FFH, FFH, FFH, AAH, AAH, AAH, AAH AAH, AAH, AAH, AAH, AAH, AAH. The computer then sets the baud rate of the SCC to 80,000 baud (8 data bits, 1 stop bit, no parity). At 80,000 baud, the effective bit frequency is 40 kHz and five bytes of data requires 0.6 ms to transmit. Since AAH translates into 10101010 in binary form, AAH produces, when transmitted at 80,000 baud, a 40 kHz square wave. The RS-422 not only transmits this bit pattern in reverse (i.e., low order bit first) but also inverts each data bit. Therefore, in the reversed bit order the encoded bit becomes 01010101, but when it is inverted, it once again becomes 10101010.

Similarly, FFH produces 11111111 when in binary form. But, as noted above, when the data is transmitted via the inverting transmission port of the RS-422 interface, it will be inverted such that the series of consecutive bits of logic value one will be transmitted as a series of bits of logic value zero, i.e., no signal. Thus, for instance, FFH produces 0.6 ms of 0 volts (i.e. no signal for 0.6 ms).

The computer sends out the start byte followed by the expansion bytes comprising the 12 data bits in succession. The resulting pattern approximates a 40 kHz amplitude modulated signal where five consecutive bytes of AAH represents 40 kHz carrier for 0.6 ms and five consecutive bytes of FFH represent no 40 kHz carrier for 0.6 ms. Control-S infrared requires two complete transmissions of each block of data in 90 ms. Therefore, in Control-S infrared mode, the computer sends the same data twice.

Figure 6A:
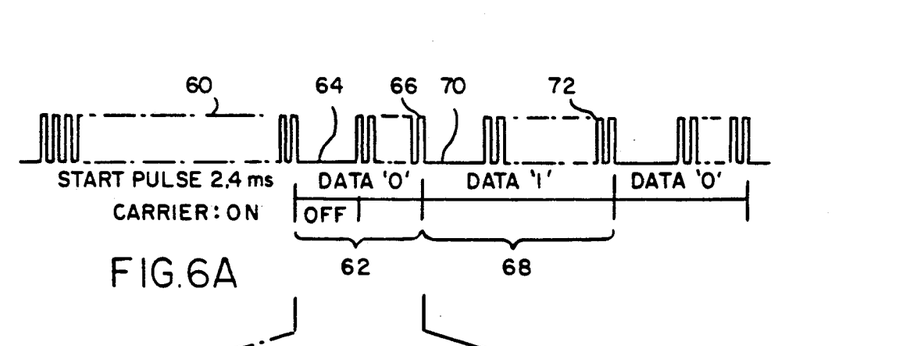
FIG. 6A is a timing diagram showing the format of data in the Control-S infrared protocol.
Figure 6B:
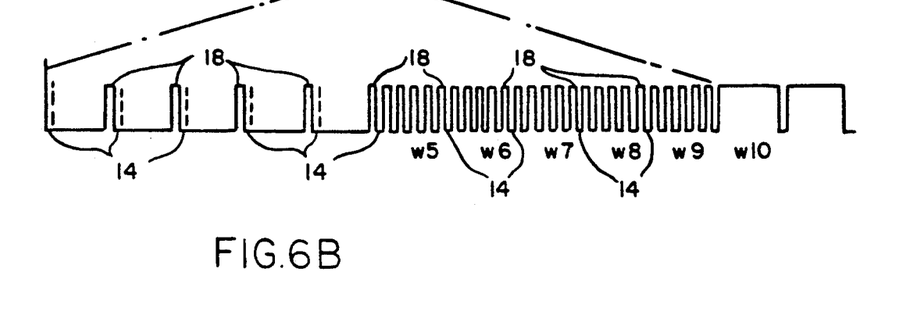
FIG. 6B is a timing diagram showing the appearance of data when encoded and transmitted via the present invention in the Control-S infrared protocol.

FIG. 6A illustrates a start pulse followed by three data bits, 010, encoded in Control-S infrared protocol. The start pulse 60 comprises 2.4 ms of the 40 kHz AM carrier. Data 0 shown at 62 in FIG. 6A comprises no signal 64 for 0.6 ms followed by the 40 kHz carrier 66 for 0.6 ms. Data 1, shown at 68 comprises no signal 70 for 0.6 s followed by the 40 kHz AM carrier 72 for 1.2 ms. FIG. 6B illustrates how the encoding and transmitting scheme of the present invention emulates the data zero bit 62 shown in FIG. 6A. Five expansion bytes of FFH are transmitted via the RS-422 which inverts the data portion of the character to logic zeros. Each logic zero bit is preceded by a start bit 14 at logic level 0 and succeeded by a stop bit 18 at logic level 1. The five succeeding bytes of AAH are each transmitted including a start bit 14 at logic level zero followed by the data AAH (10101010), and further followed by stop bit 18 at logic level 1. The resulting data "bit" 0 is shown in FIG. 6B.

HARDWARE INTERFACE

Figure 7:
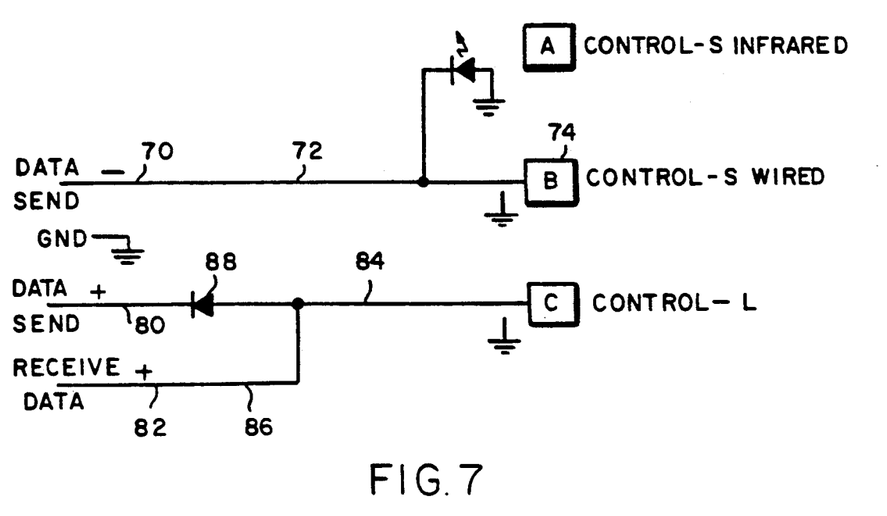
FIG. 7 is a circuit diagram showing the interfacing hardware of the present invention for interfacing to a controlled device using any one of the Control-L, Control-S wired or Control-S infrared protocols.

The hardware of the present invention coupled between the RS-422 interface and the serial input of the controlled device, or serial input and output in the case of Control-L protocol, is very simple and low cost as shown in FIG. 7. The "data send" negative terminal 70 of the RS-422 port is used when transmitting data for either of the Control-S protocols. For Control-S wired, a simple uninterrupted wire 72 is coupled between "data send" negative terminal 70 and the serial input port 74 of the audio/video equipment. The data, as encoded by the software of the present invention, transmitted at the appropriate baud rate, and inverted by the RS-422 interface needs no further processing to accurately emulate Control-S wired protocol.

For Control-S infrared transmissions, an infrared light emitting diode 76 is coupled to the data send negative terminal 70 via wire 72. The infrared LED 76 converts the data into infrared light transmissions. The audio/video equipment is equipped with light receiving means for receiving the infrared data. The transmission of data via infrared light is well known in the prior art and is frequently used for television remote controls and will not be explained in further detail.

In Control-L protocol, the controlled device can transmit as well as receive data through a single bit bi-directional port 78. The single bit port 78 of the controlled device is coupled to the "data send" positive port 80 as well as the "receive data" positive port 82 of the RS-422 interface. The connection to the "receive data" positive port 82 of the RS-422 is via uninterrupted wires 84 and 86. The connections between the "data send" positive port 80 and the single bit serial port 78 of the controlled device is also through a simple wire except that a diode 88 is disposed on the wire to prevent signals transmitted from the controlled device to appear at the transmit port 80. The diode, of course, allows data transmitted in the opposite direction to flow freely from the "data send" positive port to the single bit port 78 of the controlled device.

FLOWCHARTS OF METHOD

Figure 8:
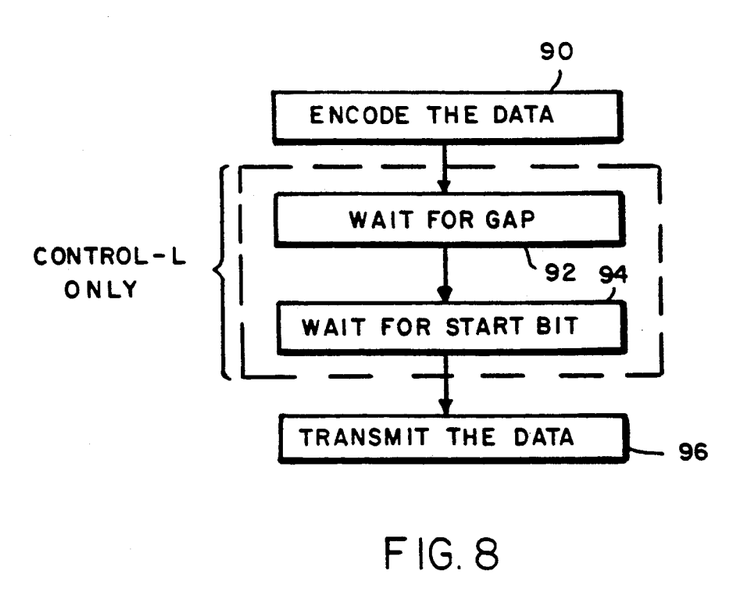
FIG. 8 is a simplified flowchart showing the program flow of the present invention for encoding and transmitting data in any of the three protocols.

FIG. 8 shows a simplified flowchart of the encoding and transmitting method according to the present invention. In each of the three protocols, the first step 90 is to encode the bits of the data byte as a series of expansion bytes and store them in a register ready for transmission. In both of the Control-S protocols, the next step is simply to transmit the data (step 96). However, in Control-L protocol, as described above, the computer must wait for a gap of 1.2 ms indicating a break in the data transmitted from the controlled device (step 92). When the gap is detected in step 92, the computer then waits to receive the start bit from the controlled device (step 94). After the start bit is received in step 94, then the computer transmits the data precisely timed to fall in the appropriate bit positions of the two empty bytes of the data from the controlled device (step 96).

In a preferred embodiment, the processor that executes the method of the present invention is the same processor that generates the data. In other words, the steps of the present invention are executed by the computer 20 in FIG. 3. However, the steps of the present invention may be carried out in a secondary processor coupled between the computer 20 and the controlled device 30 of FIG. 3. Also, the scheme of the present invention is not limited to use in computers having RS-422 standard interfaces. For instance, IBM compatible computers typically use RS-232 interfaces. The present invention may be utilized with such computers by providing a secondary processor for converting data transmitted from in RS-232 standard to RS-422 standard. The secondary processor would be coupled to the output of the RS-232 interface and further coupled to the controlled device through an RS-422 interface and the hardware of the present invention. The secondary processor could perform all encoding functions or, alternately, could perform only some of the steps while the main processor of the computer performs other steps of the encoding process. Further, the invention is not limited to the three protocols specifically discussed herein and may be used with any interface protocol whose bits can be simulated by expansion bytes transmitted at a higher baud rate.

Figure 9:
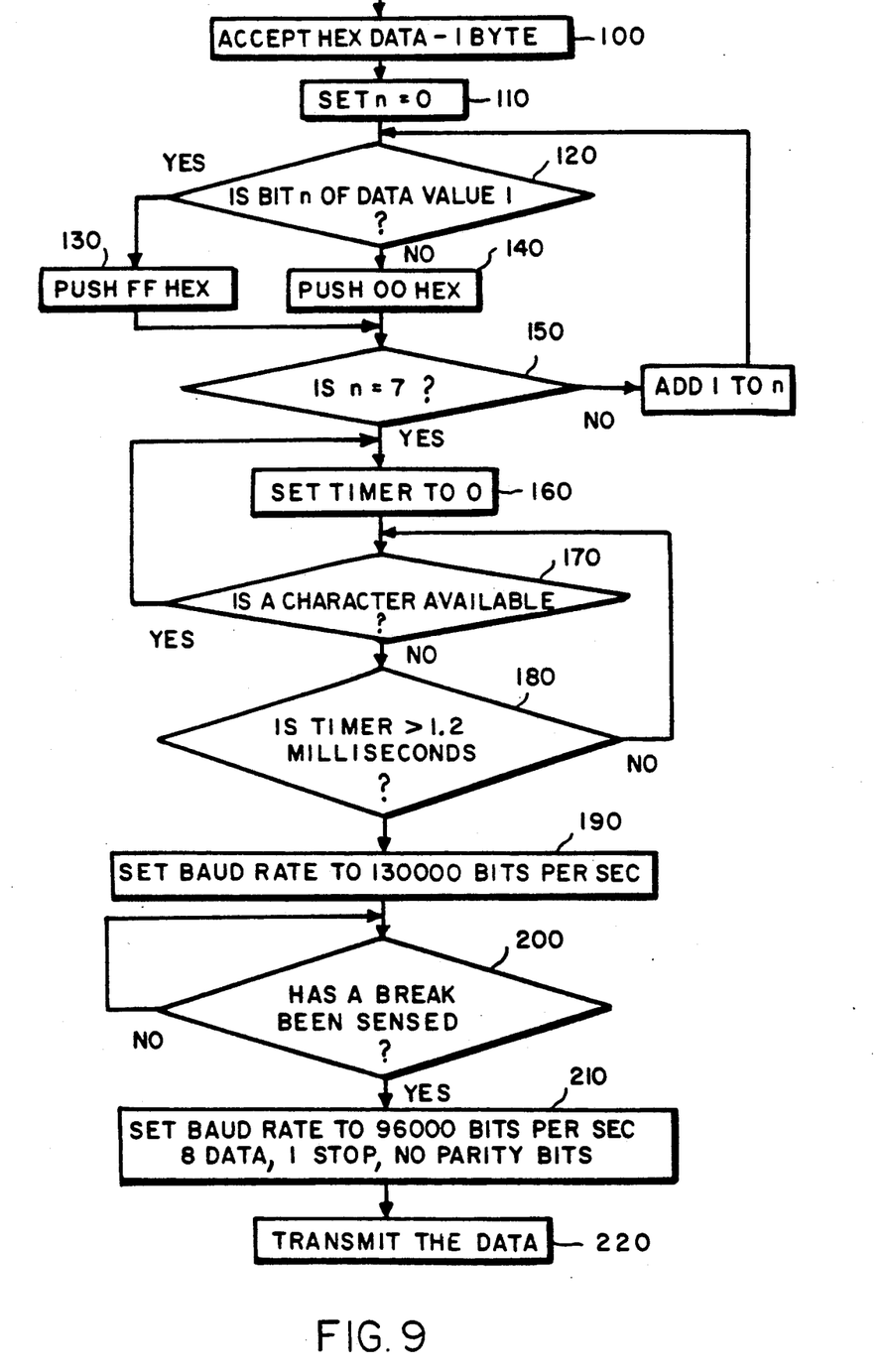
FIG. 9 is a detailed flowchart of the programming of the present invention for encoding and transmitting data in the Control-L protocol.

FIG. 9 shows a detailed flow chart of the steps for the encoding and transmission of data of the present invention for the Control-L protocol. First, in step 100, the data byte which is to be transmitted to the controlled device is received from the CPU of the computer. In step 110, a counter is set to 0. In step 120, each bit of the data byte is tested to determine if it is a 0 or a 1. If it is a 1, execution flows to step 130 where expansion byte FFH is placed in a register. If the bit is 0, 00H is placed in the register in step 140 instead. In step 150, the counter is checked to determine if all eight bits have been encoded. If not, execution flows back to step 120. When all eight bits of the data byte have been encoded, execution flows to steps 160-180 where an attempt is made to detect the beginning of a gap in the transmission from the controlled device. In step 160, a timer is set to 0. In step 170, the computer checks if a character is currently being transmitted from the controlled device. If it is, then execution loops back to step 160. However, if there is a gap, then the timer is checked in step 180 to see if 1.2 ms have elapsed since the gap began. If not, execution is looped around to step 170 again, the timer continues to increment and control loops around until 1.2 ms of no character has elapsed or until a character appears on the line, whichever occurs first. If a character appears on the line before 1.2 ms have elapsed, execution returns to step 160 to begin searching for a gap again. If 1.2 ms elapse without a character on the line, then control continues to step 190 where the baud rate of the SCC is set to 130,000 bits per second in preparation for sensing the start bit transmitted by the controlled device. In step 200, the computer looks for the break signal from the SCC. If there is no break signal, it keeps looping through step 200 until one is detected. When the break condition is detected, control is sent to step 210 where the baud rate is set to 96,000 bits per second (8 data, 1 stop, no parity bits). Finally, in step 220 the data is transmitted.

Figure 10:
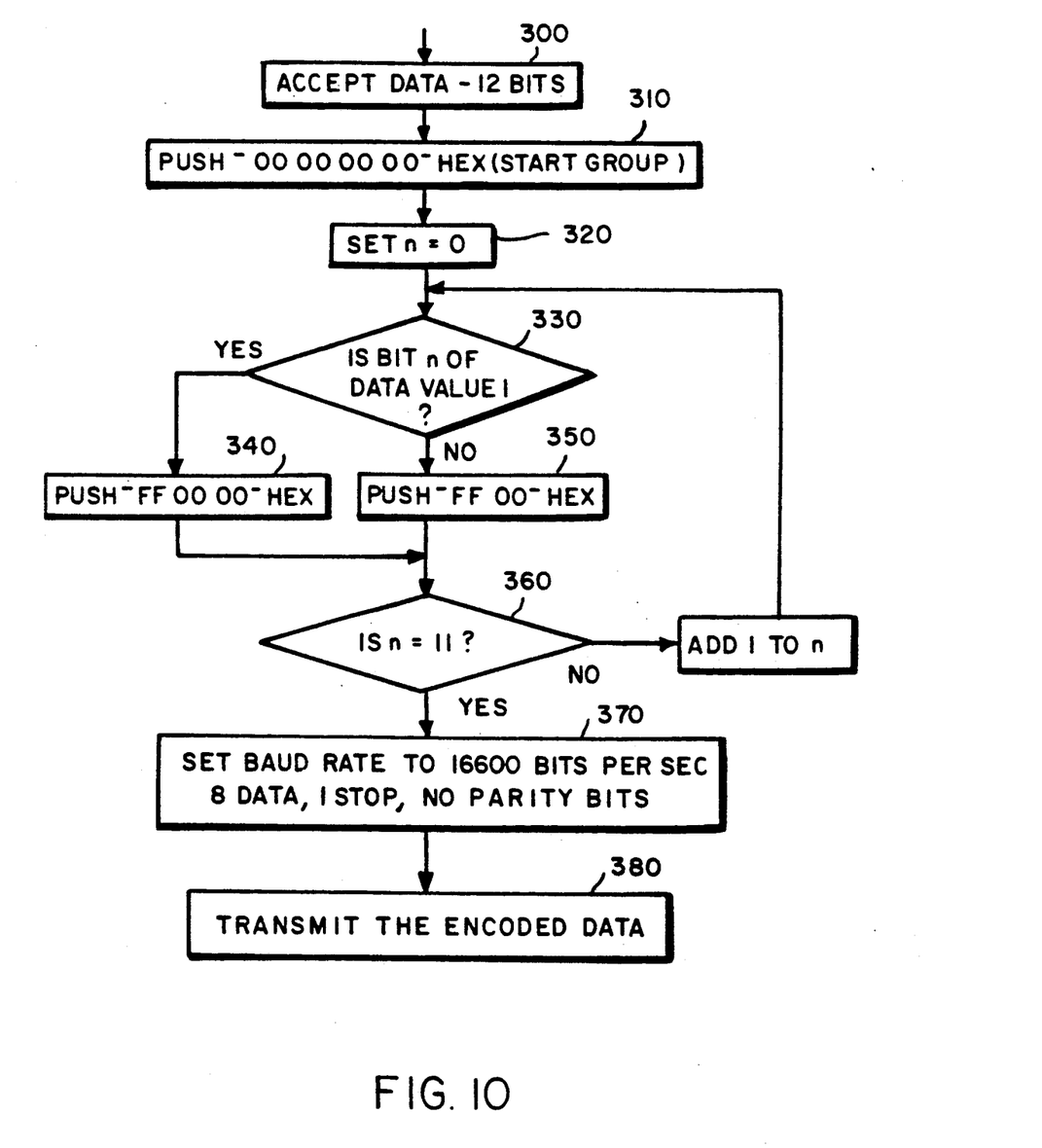
FIG. 10 is a detailed flowchart of the programming of the present invention for encoding and transmitting data in the Control-S wired protocol.

FIG. 10 illustrates a detailed flow chart for the encoding and transmission of data using the Control-S wired protocol. In step 300, the 12 bit data word generated by the computer is received for encoding and transmission. In step 310, a start bit is generated by pushing four bytes of 00H into the register. The computer then sets counter n to 0 in step 320. In steps 330, 340 and 350, each bit is encoded as FFH, 00H, 00H for logic level 1 and FFH, 00H for logic level 0. In step 360, it is determined when all 12 bits have been encoded. When all 12 bits have been encoded, execution is forwarded to step 370 where the baud rate is set to 16,600 in preparation for transmission of the encoded data. Finally, in step 380 the data is transmitted through the RS-422 interface and the hardware of the present invention to the controlled device.

Figure 11:
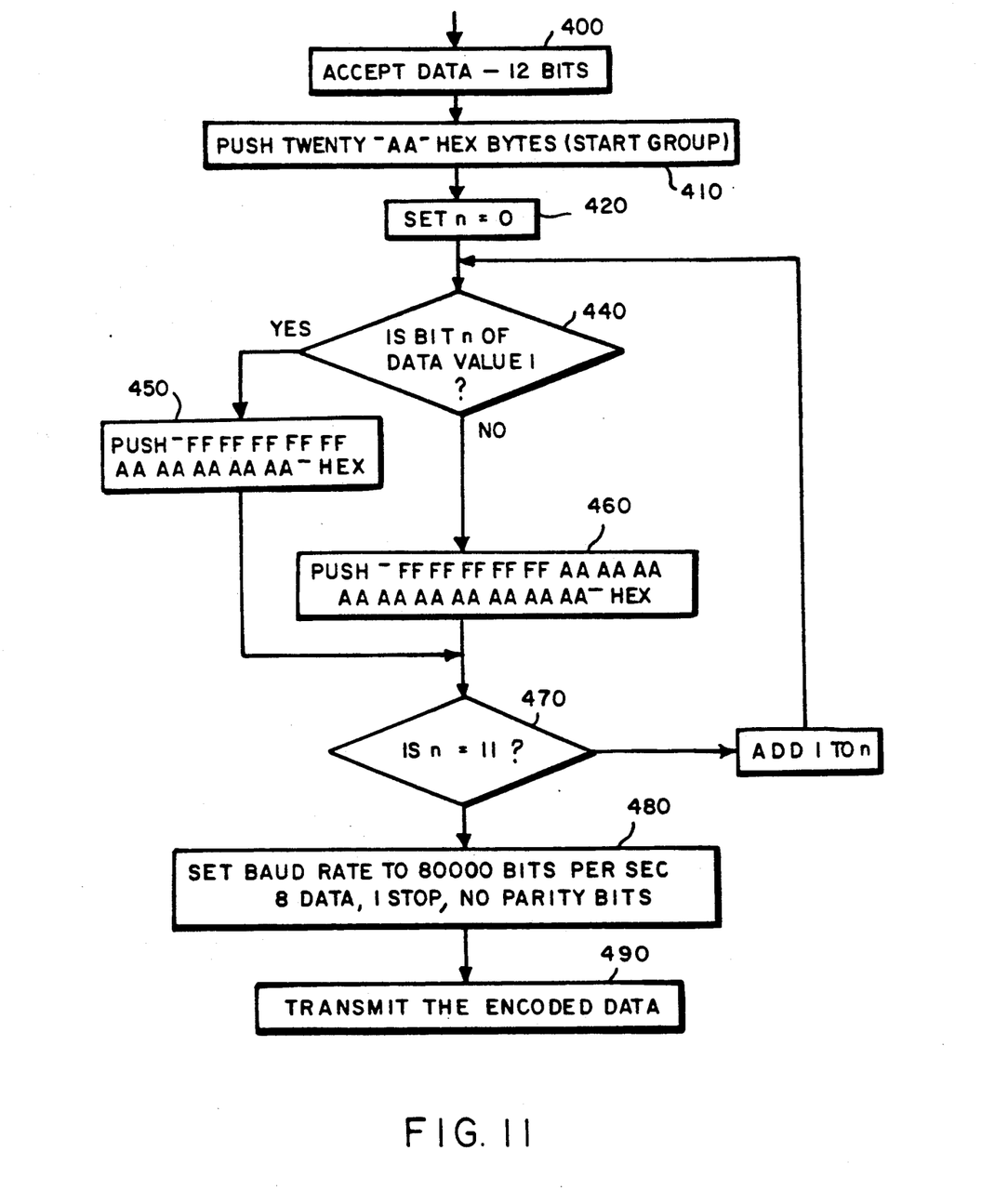
FIG. 11 is a detailed flowchart of the programming of the present invention for encoding and transmitting data in the Control-S infrared protocol.

FIG. 11 shows a detailed flow chart of the operation of the present invention when using Control-S infrared protocol. In step 400, the computer receives the 12 bit data word which is to be transmitted to the controlled device. A start signal is generated by pushing twenty AAH bytes onto the register. The computer then sets a counter to 0 in step 420. In steps 440, 450 and 460, the computer encodes each bit and places it in the register. In step 470, when all bits have been encoded, control is forwarded to step 480. In step 480, the baud rate is set to 80,000 in preparation for transmitting the encoded data. Finally, in step 490 the computer forwards the encoded data to the RS-422 interface for transmission through the hardware of the present invention to the controlled device.

Having thus described one particular embodiment of the invention, various alterations, modifications and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A method of encoding digital data bytes from a controlling device for serial transmission through a serial interface port, which serial interface port uses a first protocol, to a controlled device which uses a second protocol, said method comprising the steps of:
   encoding each bit of said digital bytes at said controlling device into an expansion byte, each said expansion byte comprising a bit pattern in said first protocol which, when transmitted by said serial interface, emulates the shape of a bit in said second protocol,
   transmitting said expansion bytes through said serial interface port in a specified order consistent with said second protocol and at a baud rate at which each expansion byte has a duration equivalent to the duration of a bit in said second protocol.

2. A method as set forth in claim 1 wherein said serial interface port is an RS-422 standard serial interface.

3. A method as set forth in claim 2 wherein each bit of said data bytes that is a logic 1 is converted into an expansion byte comprising consecutive bits of a first logic value and wherein each bit of said data bytes that is a logic 0 is converted into an expansion byte comprising consecutive bits of a second logic value.

4. A method as set forth in claim 3 wherein said controlled device uses Control-L protocol and said expansion bytes comprise eight bits.

5. A method as set forth in claim 4 wherein said controlled device has a baud rate of 9600 and said transmission baud rate is 96,000.

6. A method as set forth in claim 2 wherein said controlled device uses Control-S wired protocol and wherein each bit of said data bytes that is a logic 0 is converted into two bytes of FFH and 00H, respectively, and each bit of said data bytes that is a logic 1 is converted into three bytes of FFH, 00H and 00H, respectively.

7. A method as set forth in claim 6 wherein said baud rate is 16,600.

8. A method as set forth in claim 2 wherein said controlled device uses Control-S infrared protocol and wherein each bit of said data bytes that is a logic 0 is converted into ten consecutive bytes of FFH, FFH, FFH, FFH, FFH, 00H, 00H, 00H, 00H, 00H, respectively, and each bit of said data byte that is a logic 1 is converted into fifteen consecutive bytes of FFH, FFH, FFH, FFH, FFH, 00H, 00H, 00H, 00H, 00H, 00H, 00H, 00H, 00H, 00H, respectively.

9. A method as set forth in claim 8 wherein said baud rate is 80,000.

10. A method of encoding data for transmission from a computer via an RS-422 standard serial interface to a controlled device having a port for Control-L protocol interfacing, said encoding being such that the encoded data emulates the data format of Control-L protocol when transmitted, said method comprising the steps of:
obtaining at said computer a byte of data intended for encoding, said byte comprising individual bits of one of first and second logic values,
encoding each individual bit of said first logic value as eight consecutive bits of said first logic value,
encoding each individual bit of said second logic value as eight consecutive bits of said second logic value,
reversing the order of said encoded bits,
monitoring said port of said controlled device to detect inactivity at said port for a specified period,
after said specified inactive period is detected, monitoring said port of said controlled device at a specified baud rate that is 11-15 times the baud rate of said controlled device in order to detect a start bit transmitted by said controlled device, and
thereafter transmitting said encoded byte via said RS-422 at a baud rate ten times the baud rate of said controlled device,
whereby said transmitted byte emulates a byte of data in Control-L protocol transmitted at said baud rate of said controlled device.

11. A method as set forth in claim 10 wherein the baud rate of said controlled device is 9600, said encoded byte is transmitted at a baud rate of 96,000 and said port of said controlled device is monitored at a baud rate of 130,000.

12. A method of encoding data for transmission from a controlling device via an RS-422 standard serial interface to a controlled device adapted to communicate with other devices via Control-S wired protocol such that the encoded data emulates the data format of the Control-S wired protocol, said method comprising the steps of:
obtaining at said controlling device a byte of data for encoding, said byte comprising individual bits of one of logic zero value and logic one value,
encoding each individual bit of logic zero value as a byte comprising eight consecutive bits of a first logic value followed by a byte comprising eight consecutive bits of a second logic value,
encoding each individual bit of logic zero value as a byte comprising eight consecutive bits of a first logic value followed by a byte comprising eight consecutive bits of a second logic value,
encoding each individual bit of logic one value as a byte comprising eight consecutive bits of said first logic value followed by two bytes each comprising eight consecutive bits of said second logic value,
programming said computer to transmit data at ten times the baud rate of said controlled device,
transmitting four consecutive bytes, each byte comprising eight bits of said first logic value, from said controlling device to said controlled device via an RS-422 standard serial interface,
immediately thereafter, transmitting said encoded byte of data,
whereby said transmitted, encoded byte of data emulates a byte of data in Control-S wired protocol.

13. A method as set forth in claim 12 wherein said controlling device is a computer.

14. A method as set forth in claim 13 wherein said computer is one of an Apple II series computer or Apple Macintosh series computer.

15. A method as set forth in claim 14 wherein said controlled device comprises one of audio or video equipment.

16. A method as set forth in claim 15 wherein said controlled device is a video tape recorder.

17. A method as set forth in claim 16 wherein said first logic value is logic zero and said second logic value is logic one and wherein said bits of said encoded byte are inverted by said RS-422 standard serial interface before transmission.

18. A method as set forth in claim 17 wherein said baud rate of said controlled device is 1,660.

19. A method of encoding data for transmission from a controlling device via an RS-422 standard serial interface to a controlled device adapted to communicate with other devices via Control-S infrared protocol such that said encoded data emulates the data format of the Control-S infrared protocol, said method comprising the steps of:
obtaining at said controlling device a byte of data for encoding, said byte comprising individual bits of one of logic one value and logic zero value,
encoding each individual bit of logic value zero as five consecutive bytes, each of said five bytes comprising eight consecutive bits of logic value one followed by five additional consecutive bytes, each additional byte comprising 10101010,
encoding each individual bit of logic value one as five consecutive bytes, each of said five bytes comprising eight consecutive bits of logic value one followed by ten additional consecutive bytes, each of said additional ten bytes comprising 10101010,
programming said computer to transmit data at a baud rate of approximately fifty times the baud rate of the controlled device,
transmitting, via an RS-422 standard serial interface, twenty consecutive bytes, each byte comprising 10101010,
immediately thereafter, transmitting said encoded byte of data via said RS-422 standard serial interface and an infrared light emitting diode, whereby said transmitted and encoded byte of data emulates a byte of data in Control-S infrared protocol.

20. A method as set forth in claim 19 wherein said controlling device is a computer.

21. A method as set forth in claim 20 wherein said computer is one of an Apple II series computer or an Apple Macintosh series computer.

22. A method as set forth in claim 21 wherein said controlled device comprises one of audio or video equipment.

23. A method as set forth in claim 22 wherein said controlled device is a video tape recorder.

24. A method as set forth in claim 23 wherein said first logic value is logic one and said second logic value is logic zero and wherein said encoded byte is inverted by said RS-422 standard serial interface.

25. A method as set forth in claim 24 wherein said baud rate of said controlled device is approximately 1660 and said baud rate of said computer is approximately 80,000.

26. An apparatus for encoding and transmitting data from a digital computer to a controlled device via an RS-422 standard serial interface, said controlled device having a single bit serial port for transmitting and receiving data in Control-L protocol, said apparatus comprising:

means for encoding a data byte from said digital computer by changing each bit of said data byte to a coded byte, said coded byte comprising eight consecutive bits of a first logic level, if said bit is a logic one and comprising eight consecutive bits of a second logic level, if said bit is a zero, wire means coupled between a serial input port of said RS-422 and said port of said controlled device for receiving data transmission from the controlled device, means for detecting a 1.2 ms break in data transmission from said controlled device, means for detecting a start bit following said 1.2 ms break in data transmissions, means for transmitting said encoded data byte to a serial output terminal of said RS-422 standard serial interface at a baud rate ten times the baud rate of the controlled device, and a diode coupled from said serial output port of said RS-422 for transmitting by infrared light said encoded data to said serial port of said controlled device.

27. An apparatus as set forth in claim 26 wherein said controlled device is a piece of audio or video equipment.

28. An apparatus as set forth in claim 27 wherein the baud rate of said controlled device is 9600.

29. An apparatus as set forth in claim 28 further including means for reversing the order of the bits in the encoded data byte before transmission through said RS-422.

30. An apparatus for encoding and transmitting data from a digital computer to a controlled device via an RS-422 standard interface, said controlled device having a single bit serial port for transmitting data in Control-S wired protocol, said apparatus comprising:

means for encoding a byte of data from said digital computer by changing each bit of said byte having logic value zero to a byte comprising eight consecutive bits of a first logic value followed by a byte comprising eight consecutive bits of a second logic value and changing a bit having logic level one to a byte comprising eight consecutive bits of said first logic value followed by two bytes comprising eight consecutive bits of said second logic value, means for transmitting said encoded byte to a serial output of said RS-422 standard interface at a preselected baud rate, and wire means coupling said serial output terminal of said RS-422 standard serial interface to said input terminal of said controlled device.

31. An apparatus as set forth in claim 30 wherein said serial output terminal of said RS-422 standard serial interface inverts the signals which are output through it.

32. An apparatus as set forth in claim 31 wherein said first logic value is logic one and said second value is logic zero.

33. An apparatus for encoding and transmitting data from a digital computer to a controlled device via an RS-422 standard serial interface, said controlled device having a single bit serial port for transmitting and receiving data in Control-S infrared protocol, said apparatus comprising:

means for encoding a byte of data from said digital computer by changing each bit of said byte having logic value zero to a series of 15 consecutive bytes, the first five of which each comprise eight consecutive ones and the last ten of which each comprise logic 10101010 and by changing each bit of said byte having logic value one to ten consecutive bytes, the first five of which each comprise eight consecutive logic ones and the last five of which each comprise bits 10101010, means for transmitting said encoded bytes to a serial output terminal of said RS-422 standard serial interface at a baud rate of twice the AM carrier frequency of the controlled device, infrared light emitting diode means coupled between said serial output terminal of said RS-422 and said single bit serial port of said controlled device, for transmitting said encoded bytes via infrared signals, and means, coupled to said single bit serial port of said controlled device for receiving said infrared signals.

34. An apparatus as set forth in claim 33 further comprising means for reversing the order of the bits in the byte to be transmitted before encoding.

35. An apparatus as set forth in claim 34 wherein said serial output terminal of said RS-422 inverts the logic level of each bit.

36. An apparatus for providing a hardware interface between an RS-422 standard serial interface and a controlled device, said controlled device having a serial interface port and using one of Control-L, Control-S wired and Control-S infrared protocols, said apparatus comprising;

first, second and third ports for coupling to a send data positive port, a receive data positive port and a send data negative port, respectively, of said RS-422 standard serial interface, fourth, fifth and sixth ports for coupling to the serial interface port of a controlled device using Control-L protocol, Control-S wired protocol and Control-S infrared protocol, respectively, a diode coupled between said first and fourth ports, a wire coupled between said second and fourth ports, an infrared light emitting diode coupled between said third and sixth ports, and a wire coupled between said third and fifth ports.

* * * * *